United States Patent
Simonen et al.

(10) Patent No.: US 8,209,426 B2
(45) Date of Patent: Jun. 26, 2012

(54) METHOD, APPARATUS AND COMPUTER PROGRAM FOR ENABLING ACCESS TO CONTENT IN A NETWORK SERVICE

(75) Inventors: Hannu Antero Simonen, Oulu (FI); Jarno Tapio Väyrynen, Oulu (FI); Jani Boström, Helsinki (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 268 days.

(21) Appl. No.: 12/404,027

(22) Filed: Mar. 13, 2009

(65) Prior Publication Data

US 2010/0235429 A1   Sep. 16, 2010

(51) Int. Cl.
*G06F 15/16* (2006.01)

(52) U.S. Cl. .......................... 709/229; 709/203; 709/217

(58) Field of Classification Search .................. 709/203, 709/217, 218, 227–229
See application file for complete search history.

(56) References Cited

U.S. PATENT DOCUMENTS

| | | | |
|---|---|---|---|
| 6,356,437 B1 | 3/2002 | Mitchell et al. | |
| 7,227,498 B2 | 6/2007 | Soliman | |
| 7,287,053 B2 | 10/2007 | Bodin | |
| 2005/0038876 A1 | 2/2005 | Chaudhuri | |
| 2005/0060342 A1 | 3/2005 | Farag | |
| 2005/0188062 A1 | 8/2005 | Li et al. | |
| 2005/0232580 A1 | 10/2005 | Goldberg et al. | |
| 2005/0272413 A1 | 12/2005 | Bourne | |
| 2006/0014532 A1 | 1/2006 | Seligmann et al. | |
| 2006/0277312 A1 | 12/2006 | Hirsch | |
| 2007/0043828 A1 | 2/2007 | Famolari et al. | |
| 2007/0049296 A1 | 3/2007 | Gupta et al. | |
| 2008/0182592 A1 | 7/2008 | Cha et al. | |
| 2008/0222701 A1 | 9/2008 | Saaranen et al. | |

FOREIGN PATENT DOCUMENTS

| | | |
|---|---|---|
| EP | 1991018 A1 | 11/2008 |
| WO | 2005/125026 A2 | 12/2005 |
| WO | 2008/124459 A1 | 10/2008 |
| WO | WO 2008/142455 | * 11/2008 |
| WO | WO 2008/142455 A2 | 11/2008 |

OTHER PUBLICATIONS

International Search Report and Written Opinion for corresponding International App. No. PCT/FI2010/050097 dated Jun. 1, 2010, pp. 1-17.

* cited by examiner

*Primary Examiner* — David Lazaro

(57) ABSTRACT

An approach is provided for enabling access to content in a network service. Location information is received, at a server, relating to a first remote apparatus and another remote apparatus. The received location information is utilized to determine that the first remote apparatus and the another remote apparatus are proximal to each other. Access rights are updated within a network service to enable the user of the another remote apparatus to access content associated with the user of the first remote apparatus.

20 Claims, 6 Drawing Sheets

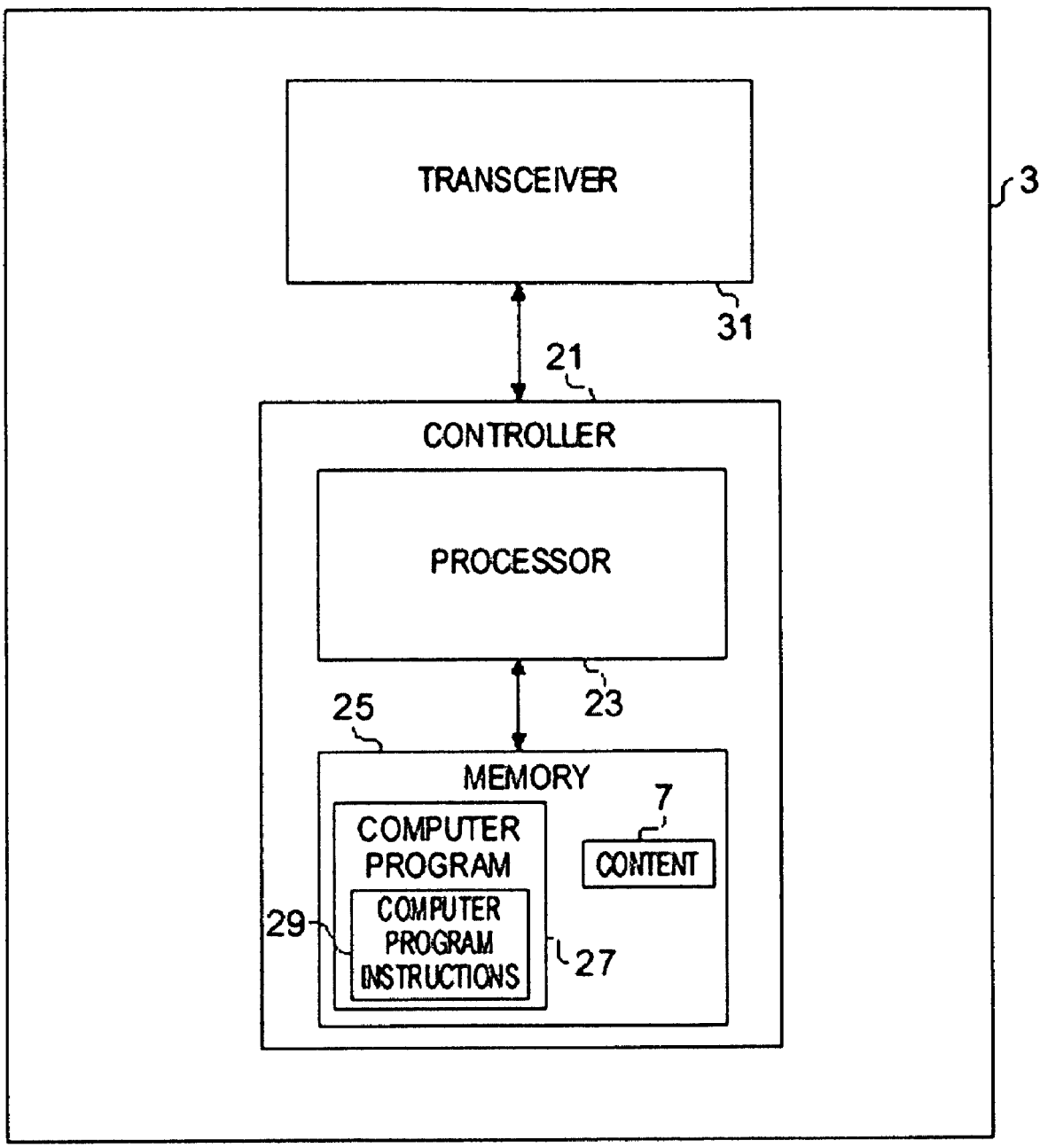

METHOD, APPARATUS AND COMPUTER PROGRAM FOR ENABLING ACCESS TO CONTENT IN A NETWORK SERVICE

FIELD OF THE INVENTION

Embodiments of the present invention relate to a method, apparatus and computer program. In particular, they relate to a method, apparatus and computer program for enabling access to content in a network service.

BACKGROUND TO THE INVENTION

Network services which enable users of the service to share content are well known. For example social networking services which enable users to make contacts, and exchange messages and other content with other users are well known. A user of such a service may store content at a server and permit other users to the service to access the content.

Such network services may be subscriber services and require a user to register with the service provider.

The content may comprise text, for example, blogs which have been created by the user or messages which have been received from other users of the service. The content may also comprise images or audio files such as music files or media files such as video files.

A user of the network service may be able to control the access rights to their content. For example they may be able to control who can access their content and the level of access other users have to their content.

It is advantageous for users of such services to be able to easily but securely change the access rights associated with their content. For example they may meet a new person and would like to permit that new person to access their content.

BRIEF DESCRIPTION OF VARIOUS EMBODIMENTS OF THE INVENTION

According to various, but not necessarily all, embodiments of the invention there is provided a method comprising: receiving, at a server, location information relating to a first remote apparatus and another remote apparatus; determining, using the received location information, that the first remote apparatus and the another remote apparatus are proximal to each other; updating access rights within a network service to enable the user of the another remote apparatus to access content associated with the user of the first remote apparatus.

In some embodiments of the invention the method may also comprise receiving, at a server, a message from the first remote apparatus indicating that a user of the first remote apparatus wishes to permit a user of another remote apparatus to access content relating to a network service; receiving, at the server, first identification information from the first remote apparatus which enables the server to identify the content to which access is to be permitted; receiving, at the server, second identification information which enables a user of the another remote apparatus to be identified.

In some embodiments of the invention the location information may be obtained using a short range wireless communication link between the first remote apparatus and the another remote apparatus. The short range wireless communication link may be a Bluetooth communication link or a near field communication link.

In some embodiments of the invention the location information may be obtained using a satellite positioning system.

In some embodiments of the invention the location information may enable the server to determine that the first remote apparatus and the another remote apparatus are within a particular region. In some embodiments of the invention the location information may enable the server to determine that the first apparatus and the another apparatus are within a predetermined distance of each other.

In some embodiments of the invention the server may update the access rights by assigning one of a plurality of access levels to the user of the another apparatus.

In some embodiments of the invention the server may also update access rights within the network service to enable the user of the first remote apparatus to access content associated with the user of the another remote apparatus.

In some embodiments of the invention the network service is a subscriber service.

According to various, but not necessarily all, embodiments of the invention there is provided an apparatus comprising: at least one receiver configured to receive location information relating to a first remote apparatus and a second remote apparatus; and a controller configured to determine using the received location information that the first remote apparatus and the another remote apparatus are proximal to each other wherein the controller is also configured to update access rights within a network service to enable the user of the another remote apparatus to access content associated with a user of the first remote apparatus.

In some embodiments of the invention the apparatus may also comprise at least one receiver configured to receive a message from the first remote apparatus indicating that a user of the first remote apparatus wishes to permit a user of another remote apparatus to access content relating to a network subscriber service; at least one receiver configured to receive first identification information from the first remote apparatus which enables the apparatus to identify the content to which access is to be permitted and second identification information which enables a user of another remote apparatus to be identified;

In some embodiments of the invention the location information may be obtained using a short range wireless communication link between the first remote apparatus and the another remote apparatus and may then be transmitted to the apparatus. In some embodiments of the invention the short range wireless communication link may be a Bluetooth communication link or a near field communication link.

In some embodiments of the invention the location information may be obtained using a satellite positioning system.

In some embodiments of the invention the location information may enable the apparatus to determine that the first remote apparatus and the another remote apparatus are within a particular region. In some embodiments of the invention the location information may enable the apparatus to determine that the first apparatus and the another apparatus are within a predetermined distance of each other.

In some embodiments of the invention the apparatus may update the access rights by assigning one of a plurality of access levels to the user of the another apparatus.

In some embodiments of the invention the apparatus may also be configured to update access rights within the network service to enable the user of the first remote apparatus to access content associated with the user of the another remote apparatus.

In some embodiments of the invention the network service may be a subscriber service.

The apparatus may be a server.

According to various, but not necessarily all, embodiments of the invention there is provided a computer program comprising computer program instruction means configured to control an apparatus, the program instructions providing, when loaded into a processor; means for receiving location information relating to a first remote apparatus and a second remote apparatus; means for determining, using the received location information, that the first remote apparatus and the another remote apparatus are proximal to each other; and means for updating the access rights within a network service to enable the user of the another remote apparatus to access the identified content.

In some embodiments of the invention the computer program may also provide means for receiving first identification information from the first remote apparatus which enables the apparatus to identify the content to which access is to be permitted and second identification information which enables a user of another remote apparatus to be identified.

In some embodiments of the invention there may be provided a computer program as described in the above paragraph.

In some embodiments of the invention there may be provided an electromagnetic carrier signal carrying the computer program as described in the above paragraph.

In some embodiments of the invention there may be provided a computer program comprising program instructions for causing a computer to perform the method as described in the above paragraphs.

According to various, but not necessarily all, embodiments of the invention there is provided a method comprising: detecting a user input at a first apparatus; in response to detection of the user input sending a message to a remote server indicating that the user of the first apparatus wishes to permit a user of another apparatus to access content relating to a network service; sending identification information from the first apparatus to the remote server wherein the identification information enables the remote server to identify the content to which access is to be permitted; enabling location information to be sent to the remote server wherein the location information enables the remote server to determine that the first apparatus and the another apparatus are proximal to each other.

In some embodiments of the invention the location information may be obtained using a short range wireless communication link between the first apparatus and the another apparatus. In some embodiments of the invention the short range wireless communication link may be a Bluetooth communication link or a near field communication link.

In some embodiments of the invention the location information may be obtained using a satellite positioning system.

In some embodiments of the invention the location information may enable the remote server to determine that the first apparatus and the another apparatus are within a particular region. In some embodiments of the invention the location information may enable the remote server to determine that the first apparatus and the another apparatus are within a predetermined distance of each other.

In some embodiments of the invention the user of the first apparatus may permit a user of another apparatus to access content by assigning one of a plurality of access levels to the user of the another apparatus.

In some embodiments of the invention the network service may be a subscriber service.

According to various, but not necessarily all, embodiments of the invention there is provided an apparatus comprising: a user input device; a transmitter configured to enable information to be sent to a remote server; a controller configured to detect actuation of the user input device and, in response to the detection of the actuation, control the transmitter to send a message to a remote server indicating that the user of the apparatus wishes to permit a user of another apparatus to access content relating to a network service wherein the controller is also configured to enable information to be sent from the apparatus to the remote server wherein the identification information enables the remote server to identify the content to which access is to be permitted and to enable location information to be sent to the remote server wherein the location information enables the server to determine that the apparatus and the another apparatus are proximal to each other.

In some embodiments of the invention the apparatus may comprise a transceiver configured to enable a short range wireless communication link to be established between the first apparatus and the another apparatus wherein the short range wireless communication link may enable the location information to be obtained. The short range wireless communication link may be a Bluetooth communication link or a near field communication link.

In some embodiments of the invention the transmitter may be configured to enable the apparatus to communicate in a satellite positioning system such that the location information may be obtained using a satellite positioning system.

In some embodiments of the invention the location information may enable the remote server to determine that the apparatus and the another apparatus are within a particular region. In some embodiments of the invention the location information may enable the remote server to determine that the apparatus and the another apparatus are within a predetermined distance of each other.

In some embodiments of the invention the user of the apparatus may permit a user of another apparatus to access content by assigning one of a plurality of access levels to the user of the another apparatus.

The apparatus may be for wireless communication.

According to various, but not necessarily all, embodiments of the invention there is provided a computer program comprising computer program instruction means configured to control an apparatus, the apparatus comprising a user input device and a transmitter wherein the transmitter is configured to enable information to be sent to a remote server the program instructions providing, when loaded into a processor; means for detecting actuation of the user input device and, in response to the detection of the actuation, controlling the transmitter to send a message to a remote server indicating that the user of the apparatus wishes to permit a user of another apparatus to access content relating to a network service; means for enabling information to be sent from the apparatus to the remote server wherein the identification information enables the remote server to identify the content to which access is to be permitted; and means for enabling location information to be sent to the remote server wherein the location information enables the remote server to determine that the apparatus and the another apparatus are proximal to each other.

In some embodiments of the invention there may be provided a physical entity embodying the computer program as described in the above paragraph.

In some embodiments of the invention there may be provided an electromagnetic carrier signal carrying the computer program as described in the above paragraph.

In some embodiments of the invention there may be provided a computer program comprising program instructions for causing a computer to perform the method described in any of the above paragraphs.

A system comprising: a server and a plurality of apparatus where the server is remote from the plurality of apparatus; wherein at least one of the apparatus comprises a user input device; a transmitter configured to enable information to be sent to the remote server; a controller configured to detect actuation of the user input device and, in response to the detection of the actuation, control the transmitter to send a message to the remote server indicating that the user of the apparatus wishes to permit a user of another apparatus to access content relating to a network service wherein the controller is also configured to enable information to be sent from the first apparatus to the remote server wherein the identification information enables the remote server to identify the content to which access is to be permitted and to enable location information to be sent to the remote server wherein the location information enables the server to determine that the first apparatus and the another apparatus are proximal to each other; and the server comprises at least one receiver configured to receive the message from the at least one remote apparatus indicating that the user of the at least one apparatus wishes to permit a user of another apparatus to access the content relating to a network service; at least one receiver configured to receive first identification information from the at least one apparatus which enables the apparatus to identify the content to which access is to be permitted and second identification information which enables a user of the another apparatus to be identified; at least one receiver configured to receive location information of the at least one apparatus and the another apparatus; and a controller configured to determine using received location information that the at least one apparatus and the another apparatus are proximal to each other wherein the controller is also configured to update the access rights within the network service to enable the user of the another apparatus to access the identified content.

BRIEF DESCRIPTION OF THE DRAWINGS

For a better understanding of various examples of embodiments of the present invention reference will now be made by way of example only to the accompanying drawings in which:

FIG. 2 illustrates a first apparatus of the system of FIG. 1 in more detail;

DETAILED DESCRIPTION OF VARIOUS EMBODIMENTS OF THE INVENTION

The Figures illustrate a method comprising: receiving, at a server 3, location information relating to a first remote apparatus 5A and another remote apparatus 5B; determining, using the received location information, that the first remote apparatus 5A and the another remote apparatus 5B are proximal to each other; updating access rights within a network service to enable the user of the another remote apparatus 5B to access content 7 associated with the user of the first remote apparatus 5A.

Figure 1:
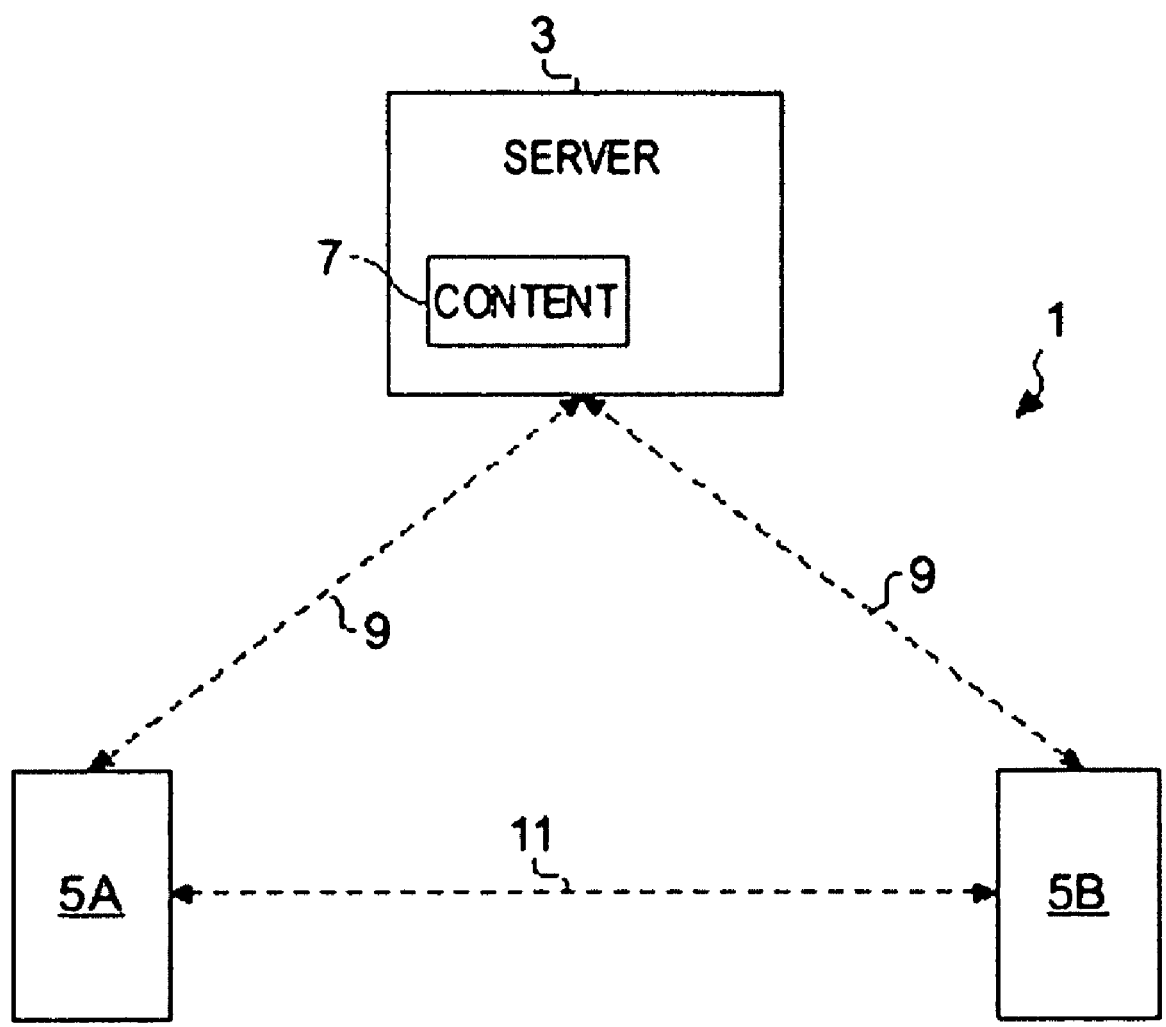
FIG. 1 illustrates a system according to an embodiment of the invention.

FIG. 1 illustrates a system 1 according to a first embodiment of the invention. In the illustrated embodiment the system 1 comprises a first apparatus 3 and a plurality of second apparatus 5A, 5B. Only two second apparatus 5A, 5B are illustrated in FIG. 1. It is to be appreciated that in other embodiments of the invention there may be more than two second apparatus 5A, 5B.

In the illustrated embodiment of the invention the first apparatus is a server 3. The server 3 may be configured to enable users of the second apparatus 5A and 5B to access content 7 relating to a network service. In the illustrated embodiment the content 7 is stored at the server 3. In other embodiments of the invention the content 7 may be stored at a different location which is accessible by the server 3.

The server 3 is configured to enable a user of a second apparatus 5A, 5B to update access rights associated with content 7 relating to the network service.

An example of a server 3 according to embodiments of the invention is illustrated in more detail in FIG. 2.

The second apparatus 5A, 5B may be an electronic apparatus. In the illustrated embodiment the second apparatus 5A and 5B are mobile apparatus which may be easily carried by a user. The mobile apparatus 5A, 5B may be a handheld apparatus which can be carried in a user's hand, handbag or jacket pocket for example. The mobile apparatus 5A, 5B may be, for example, a mobile cellular telephone, a personal computer, a personal digital assistant or any other apparatus that enables a user to access a network service.

In other embodiments of the invention one or more of the second apparatus 5A, 5B may not be a mobile apparatus, for example it may be a desk top computer or a communication device which is connected to a communication network by a wired or fixed connection.

Figure 3:
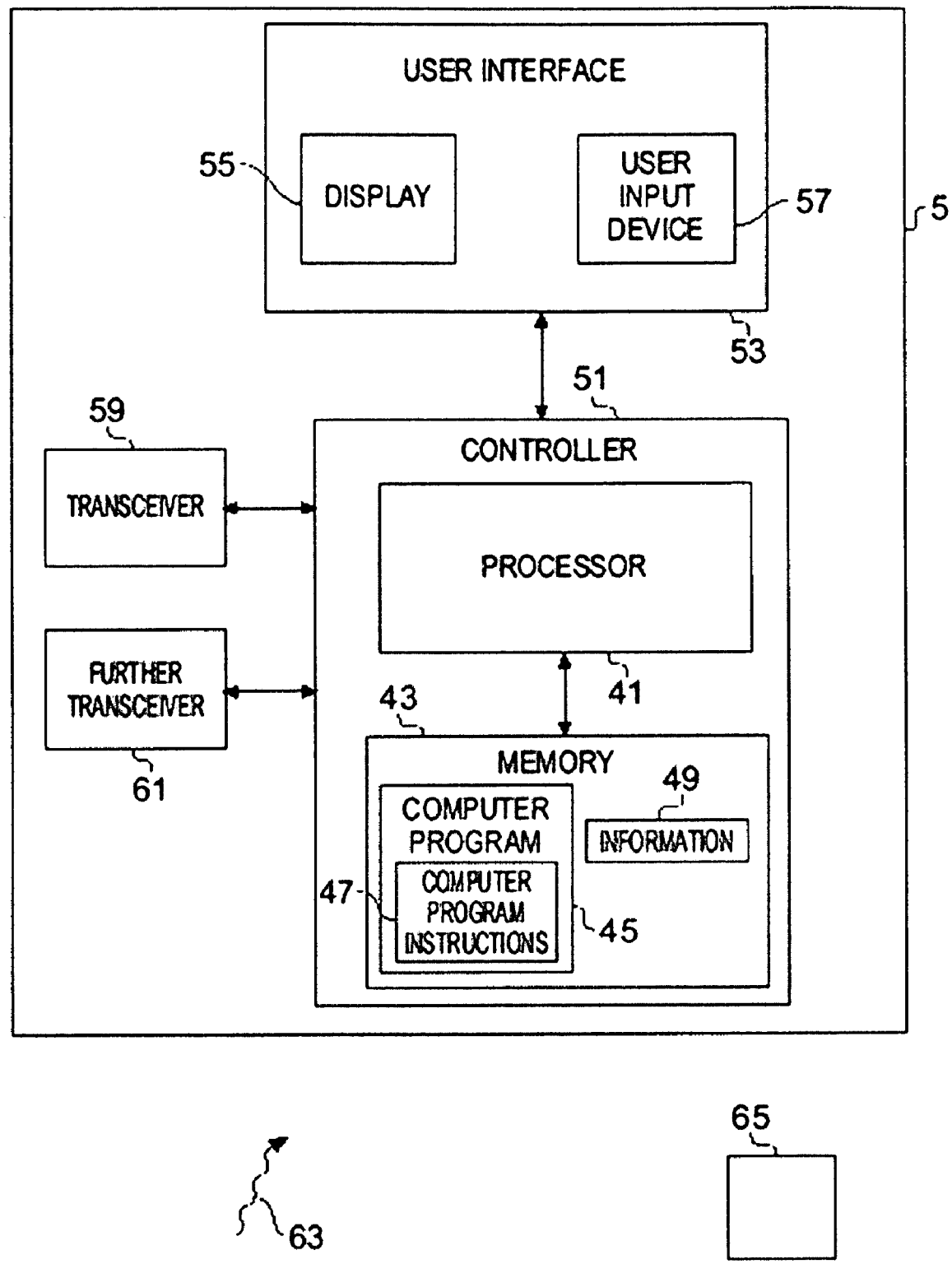
FIG. 3 illustrates a second apparatus of the system of FIG. 1 in more detail.

An example of a mobile apparatus 5A, 5B according to embodiments of the invention is illustrated in more detail in FIG. 3.

The system 1 also comprises a plurality of first communication links 9 between the server 3 and the mobile apparatus 5A and 5B. The first communication links 9 may be any links which enable messages and information to be transferred between the server 3 and the mobile apparatus 5A, 5B. The first communication link 9 may comprise a wired communication connection or it may comprise a wireless communication connection or it may comprise both wired and wireless connections. In some embodiments of the invention the first communication link 9 may be a cellular network communication link.

The system 1 may also comprise a second communication link 11 between the mobile apparatus 5A and 5B. The second communication link 11 may be any communication link which enables messages and information to be transferred between the two mobile apparatus 5A and 5B. In some embodiments of the invention the second communication link 11 may be a short range wireless communication link such as a Bluetooth link, a wireless local area network (WLAN) link, a near field communication (NFC) link or a radio frequency identification (RFID) link.

The communication links 9, 11 may be secure communication links.

The server 3 is located remotely from the mobile apparatus 5A, 5B in that the server 3 may only communicate with the mobile apparatus 5A, 5B via the external communication links 9. The server 3 may be located far away from the mobile apparatus 5A, 5B. In some embodiments of the invention the server 3 may be located many kilometres away from the mobile apparatus 5A, 5B. As the mobile apparatus 5A, 5B may be easily carried by a user the distance separating a mobile apparatus 5A, 5B and the server 3 may change and the distance separating the two mobile apparatus 5A and 5B may also change.

FIG. 2 schematically illustrates a server 3 according to embodiments of the invention. Only features referred to in the following description are illustrated. It should, however, be understood that the server 3 may comprise additional features that are not illustrated.

As mentioned above the server 3 may be configured to enable users of remote mobile apparatus 5A, 5B to access content relating to a network service. The server 3 is also configured to enable the users to update access rights relating to their content in accordance with embodiments of the invention.

In the illustrated embodiment of the invention the server 3 comprises: a controller 21 and transceiver 31. In some embodiments of the invention the server 3 may comprise more than one transceiver 31. In the illustrated embodiment the controller 21 comprises a processor 23 and a memory 25.

The controller 21 provides means for controlling the server 3. The controller 21 may be implemented using instructions that enable hardware functionality, for example, by using executable computer program instructions 29 in a general-purpose or special-purpose processor 23 that may be stored on a computer readable storage medium 25 (e.g. disk, memory etc) to be executed by such a processor 23.

The processor 23 is configured to receive input signals from the transceiver 31 and also to provide output signals to the transceiver 31. The processor 23 is also configured to write to and read from the memory 25.

The memory 25 stores a computer program 27 comprising computer program instructions 29 that control the operation of the server 3 when loaded into the processor 23. The computer program instructions 29 provide the logic and routines that enables the server to perform the methods blocks illustrated in FIGS. 4, 5 and 6. The processor 23 by reading the memory 25 is able to load and execute the computer program 27.

The computer program instructions 29 may provide computer readable program means for enabling the server 3 to receive a message from a first remote apparatus 5A indicating that a user of the first remote apparatus 5A wishes to permit a user of another remote apparatus 5B to access content 7 relating to a network service.

The computer program instructions 29 may also provide computer readable program means for enabling first identification information to be received from the first remote apparatus 5B which enables the server 3 to identify the content 7 to which access is to be permitted and second identification information which enables a user of another remote apparatus 5B to be identified. The computer program instructions 29 may also provide computer readable program means for enabling location information to be received relating to the first remote apparatus 5A and the second remote apparatus 5B; and means for determining, using the received location information, that the first remote apparatus 5A and the another remote apparatus 5B are proximal to each other. The computer program instructions 29 may also provide computer readable program means for enabling the controller 21 to update the access rights within the network service to enable the user of the another remote apparatus 5B to access the identified content 7.

The computer program 27 may arrive at the server 3 via any suitable delivery mechanism 33, 35. The delivery mechanism 33, 35 may be, for example, a computer-readable storage medium, a computer program product 35, a memory device, a record medium such as a CD-ROM or DVD, an article of manufacture that tangibly embodies the computer program 27. The delivery mechanism may be a signal 33 configured to reliably transfer the computer program 27. The server 3 may propagate or transmit the computer program 27 as a computer data signal.

The memory 25 may also store content 7. The content 7 may be content relating to a network service such as a content sharing service or a social networking service. The content 7 may comprise personal information relating to a user of a mobile apparatus 5A, 5B. The content 7 may comprise text. The text may be, for example, messages which may have been input by the user of the mobile apparatus 5A, 5B or received from other users of the network service. The content 7 may also comprise images, audio files such as music files, media files such as video files or any other information which a user of a mobile apparatus 5A, 5B may wish to share using the network service.

Although the memory 25 is illustrated as a single component in FIG. 2 it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device.

The transceiver 31 may be any means which enables a communication link 9 to be established between the server 3 and one or more mobile apparatus 5A, 5B.

The controller 21 may be configured to provide data to the transceiver 31 for transmission over the communication link 9. The controller 21 may also be configured to decode signals received by the transceiver 31 into information. The received information may be stored in the memory 25. The received information may be used to control the server 3, for example the received information may be used to control the server 3 to update the access rights associated with content 7 relating to a network service.

FIG. 3 schematically illustrates a mobile apparatus 5 according to embodiments of the invention. Only features referred to in the following description are illustrated. It should, however, be understood that the mobile apparatus 5 may comprise additional features that are not illustrated. The mobile apparatus 5 illustrated in FIG. 3 may be any of the mobile apparatus 5A, 5B of the system 1 illustrated in FIG. 1.

As mentioned above the mobile apparatus 5 may be any mobile electronic apparatus such as a mobile cellular telephone which enables a user to access a network service such as a content sharing service or a social networking service.

The mobile apparatus 5 illustrated in FIG. 3 comprises: a controller 51, a user interface 53 and a first transceiver 59. In some embodiments of the invention the mobile apparatus 5 may also comprise a further transceiver 61.

In the illustrated embodiment the controller 51 comprises a processor 41 and a memory 43 and the user interface 53 comprises display 55 and a user input device 57.

The controller 51 of the mobile apparatus 5 provides means for controlling the mobile apparatus 5 and may be implemented using instructions that enable hardware functionality, for example, by using executable computer program instructions 47 in a general-purpose or special-purpose processor 41 that may be stored on a computer readable storage medium 43 (e.g. disk, memory etc) to be executed by such a processor 41.

The processor 41 is configured to receive input commands from the user interface 53 and also to provide output commands to the user interface 53. The processor 23 is configured to receive input signals from the transceivers 59, 61 and also to provide output signals to the transceivers 59, 61. The processor 41 is also configured to write to and read from the memory 43.

The user interface 53 provides means for enabling a user of the mobile apparatus 5 to input information. The input information may be, for example, content 7 such as text or images which may be sent to and stored at the remote server 3. The input information may also be control information which may be used to input commands to control the mobile apparatus 5 or to transmit messages to the remote server 3.

The user input device 57 may be any means which enables a user to input information into the mobile apparatus 5. For example the user input device 57 may be a keypad or a portion of a touch sensitive display or a combination of a number of different types of user input devices.

The user input device 57 may comprise one or more keys which are dedicated to specific functions. One of the dedicated keys may be associated with the function of indicating that the user of the mobile apparatus 5 wishes to enable a user of another mobile apparatus 5 to access content 7 relating to the network service. Actuation of such a dedicated key may enable a message to be sent to a remote server 3 to indicate that the user of the mobile apparatus 5 wishes to update the access rights associated with their content 7.

The display 55 may be configured to display information to a user. The information displayed on the display 55 may be information which has been input by a user of the mobile apparatus 5 via the user input device 57 or information which has been received at the mobile apparatus 5 via the first transceiver 59 or the further transceiver 61.

The memory 43 stores a computer program 45 comprising computer program instructions 47 that control the operation of the mobile apparatus 5 when loaded into the processor 41. The computer program instructions 47 provide the logic and routines that enables the mobile apparatus 5 to perform the blocks of the methods illustrated in FIGS. 4, 5 and 6. The processor 41 by reading the memory 43 is able to load and execute the computer program 45.

The computer program instructions 47 may provide computer readable program means for enabling information to be sent to a remote server 3 via the transceiver 59.

The computer program instructions 47 may also provide computer readable program means for enabling detection of actuation of the user input device 57 and, in response to the detection of the actuation, enabling the transceiver 59 to be controlled to send a message to a remote server 3 indicating that the user of the apparatus 5A wishes to permit a user of another apparatus 5B to access content 7 relating to a network service. The computer program instructions 47 may also provide computer readable program means for enabling information to be sent from the first apparatus 5A to the remote server 3 wherein the identification information enables the remote server 3 to identify the content to which access is to be permitted; and means for enabling location information to be sent to the remote server 3 wherein the location information enables the remote server 3 to determine that the first apparatus 5A and the another apparatus 5B are proximal to each other.

The computer program 45 may arrive at the second apparatus 5 via any suitable delivery mechanism 63, 65. The delivery mechanism 63, 65 may be, for example, a computer-readable storage medium, a computer program product 65, a memory device, a record medium such as a CD-ROM or DVD, an article of manufacture that tangibly embodies the computer program 45. The delivery mechanism may be a signal 63 configured to reliably transfer the computer program 45. The second apparatus 5 may propagate or transmit the computer program 45 as a computer data signal.

The memory 43 may also be configured to store identification information 49. The identification information 49 may comprise any information which enables the user of the mobile apparatus 5 to be identified within the network service. The identification information may enable the server 3 to determine which content 7 is associated with the user of the mobile apparatus 5. The identification information 49 may also comprise information which has been input by a user of the apparatus 5 using the user input device 57. For example, the identification information 49 may comprise a security code such as a password or pin number which the user has chosen. The identification information 49 may also comprise information which uniquely identifies the mobile apparatus 5.

In the illustrated embodiment the memory 43 is illustrated as a single component. It is to be appreciated that in other embodiments the memory 43 may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device.

The transceiver 59 may be any means which enables a communication link 9 to be established between the mobile apparatus 5 and the remote server 3 as illustrated in FIG. 1.

The controller 51 may be configured to provide data to the transceiver 59 for transmission over the communication link 9. The controller 51 may also be configured to decode signals received by the transceiver 59 into information. The received information may be stored in the memory 43.

In some embodiments of the invention the mobile apparatus 5 may also comprise a further transceiver 61. The further transceiver 61 may be configured to enable a communication link 11 to be established between the second apparatus 5A and another, different mobile apparatus 5B as illustrated in FIG. 1.

The communication link 11 between the two mobile apparatus 5A and 5B may be a short range communication link 11. For example, as described above, the communication link 11 may be a Bluetooth link, a wireless local area network (WLAN) link, a near field communication (NFC) link or a radio frequency identification (RFID) link or any other short range connection which enables the secure transfer of information between two mobile apparatus 5A, 5B.

The controller 51 may be configured to provide data to the further transceiver 61 for transmission over the communication link 11. The controller 51 may also be configured to decode radio signals received by the further transceiver 61 into information. The received information may be stored in the memory 43.

It is to be appreciated that in some embodiments of the invention only a single transceiver may be provided in the mobile apparatus 5 and this may be configured to provide both a first communication link 9 with a remote server 3 and a second communication link 11 with another mobile apparatus 5. It is also to be appreciated that separate transmitters and receivers may be provided rather than transceivers.

Figure 4:
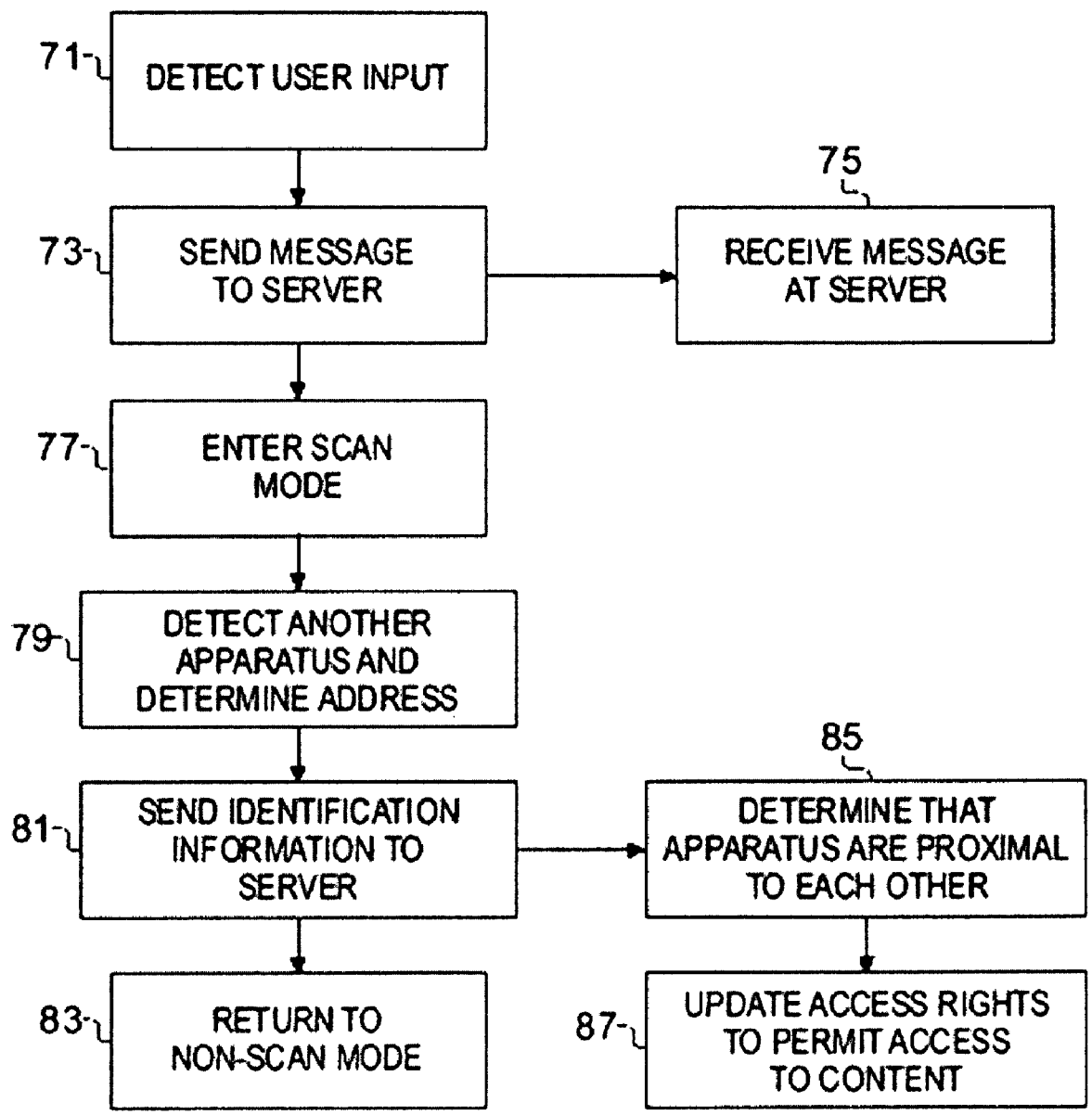
FIG. 4 illustrates a flow chart showing method blocks of a first embodiment of the invention.

A first method of enabling access to content within a network service according to various embodiments of the invention is illustrated schematically in FIG. 4. Blocks 71, 73, 77, 79, 81 and 83 of the illustrated method occur at a first mobile apparatus 5A and blocks 75, 85 and 87 occur at a remote server 3 as illustrated in FIG. 1.

In the embodiments of the invention illustrated in FIG. 4, both of the mobile apparatus 5A and 5B are Bluetooth enabled so that the second communication link 11 between the two mobile apparatus 5A, 5B is a Bluetooth communication link. The further transceiver 61 of the mobile apparatus 5A, 5B is configured to enable Bluetooth communication and is configured to operate in a frequency band of 2400-2483.5 MHz with a communication range in the order of 10 meters. It is to be appreciated that other types of communication links maybe used in other embodiments of the invention.

In the exemplary embodiment illustrated in FIG. 4 the user of a mobile apparatus 5A wishes to enable the user of another mobile apparatus 5B to access content associated with the user of the first apparatus 5A within a network service. The two users may be proximal to each other, for example they may be close enough together to have a conversation with each other. The mobile apparatus 5A, 5B may be carried by the users and so the mobile apparatus 5A and 5B may also be proximal to each other. As a result of the conversation the two users may wish to exchange information using the network service. In some embodiments of the invention both of the users of the apparatus may be users or subscribers of the same network service. In other embodiments of the invention they may be users or subscribers of different network services.

At block 71 the controller 51 of the mobile apparatus 5A detects a user input made via the user input device 57. The user input indicates that the user wishes to enable the user of another mobile apparatus 5B to access content 7 relating to the network service. The user input may be, for example, actuation of a dedicated key or selection of an option from a plurality of menu of options.

In response to the detection 71 of the user input, at block 73 the controller 51 controls the transceiver 59 to send a message to the remote server 3. The message may be sent over the first communication link 9. The message indicates that the user of the mobile apparatus 5A wishes to update the access rights associated with their content 7 by permitting the user of the another mobile apparatus 5B to access the content 7.

In some embodiments of the invention the message may also contain identification information. The identification information may be sufficient to enable the server 3 to identify the user of the first mobile apparatus 5A and the content 7 to which access is to be permitted.

The message may also indicate the level of access which is to be permitted, for example, the message may also indicate whether the other user is permitted to view the content 7 or to view and also edit the content 7.

In some embodiments of the invention the message may indicate which one of a plurality of access levels is to be assigned to the other user where each access level enables access to different content. For example a first access level may enable access to a users contact information and enable the other user to send them messages or contact them, a second access level may enable the other user to view the contact information and also view some personal content such as text and a third access level may enable the other user to view to the contact information, the personal content such as text and also further personal content such as images. Each access level may be assigned a label, for example the access level may be the associate level, the second access level may be the friend level and the third access level may be a best friend level. The user of the apparatus may be able to select which level of access they assign to the other user.

At block 75 the message is received by the remote server 3. In response to the receipt of the message the server 3 may authenticate the user of the mobile apparatus 5A and access the content 7 identified in the received message.

At block 77 the mobile apparatus 5A enters scan mode. In some embodiments of the invention the mobile apparatus 5A may automatically enter scan mode in response to detection 71 of the user input. In other embodiments of the invention the mobile apparatus 5A may enter scan mode upon receipt of an indication from the server 3 that the message has been received (block 75) and the user of the mobile apparatus 5A has been authenticated.

When the mobile apparatus 5A enters the scan mode controller 51 configures the Bluetooth transceiver 61 to scan for other mobile apparatus 5B nearby. As the Bluetooth transceiver 61 only has a communication range in the order of tens of meters the mobile apparatus 5A will only be able to detect other mobile apparatus 5B which are close by.

At block 79 the mobile apparatus 5A detects another mobile apparatus 5B and establishes a Bluetooth communication link between the two mobile apparatus 5A, 5B. The two mobile apparatus 5A, 5B exchange identification information with each other via the Bluetooth communication link. The identification information may be information which enables the mobile apparatus 5A, 5B or the user of the mobile apparatus 5A, 5B to be uniquely identified. In some embodiments of the invention the identification information may be a security code such as a password or pin number which has been verbally exchanged by the users of the two mobile apparatus 5A, 5B and enables the two mobile apparatus 5A, 5B to form a trusted relationship such as a Bluetooth pair.

At block 81 the mobile apparatus 5A sends the received identification information to the server 3 over the first communication link 9 and then, at block 83 returns to non-scan mode so that the transceiver 61 is no longer scanning for other apparatus.

At block 85 the remote server 3 receives the identification information from the apparatus 5A. As the identification information has been exchanged via a Bluetooth communication link 11 the server 3 determines that the two mobile apparatus 5A and 5B must be proximal to each other because this is a short range communication link 11. Therefore the identification information also comprises location information as it enables the server 3 to determine the relative locations of the two mobile apparatus 5A and 5B. The server 3 also determines the identity of the user of the another mobile apparatus 5B using the information which has been received.

At block 87 the server updates access rights associated with the content 7 so that the user of the another mobile apparatus 5B is permitted to access the content 7. The server 3 may update the access rights by assigning a particular access level to a user of the another apparatus 5B. This may change an existing access level or may be the first time that an access level is assigned to the user. This enables the user of the first apparatus 5A to change the access level assigned to existing contacts and also make new contacts.

Once block 87 has been completed the user of the another mobile apparatus 5B can access the content 7. The user may use the another mobile apparatus 5B to access the content.

In the above described embodiment only one of the mobile apparatus 5A sends information to the remote server 3. It is to be appreciated that in other embodiments of the invention both of the mobile apparatus 5A, 5B could send information to the server 3. For example, the user of the another mobile apparatus 5B may also send a message indicating that they wish to permit the user of the first mobile apparatus 5A to access their content. Requiring both of the mobile apparatus 5A, 5B to send information and messages to the server 3 may increase the security of the system.

Embodiments of the invention provide a quick and easy way of enabling a user of a network service to use the network service to share their content with other users. By providing the server 3 with identification information relating to both of the mobile apparatus 5A, 5B the server 3 can update the access rights associated with the content without any further input from either of the users. This means that once the user has made the user input to indicate that they wish to permit another user to access the content 7 all other steps may be carried out automatically by the controllers 21, 51 of the two mobile apparatus 5A and 5B and the server 3 without any further user input from either of the users. This makes the embodiments of the invention very simple and convenient for a user to use.

Also by using the server 3 to determine that the two apparatus 5A and 5B are proximal to each other this ensures that only the intended users are authorized to access the content. Using a Bluetooth communication link provides the advantage that a trusted relationship can be established between the two apparatus 5A, 5B.

Figure 5:
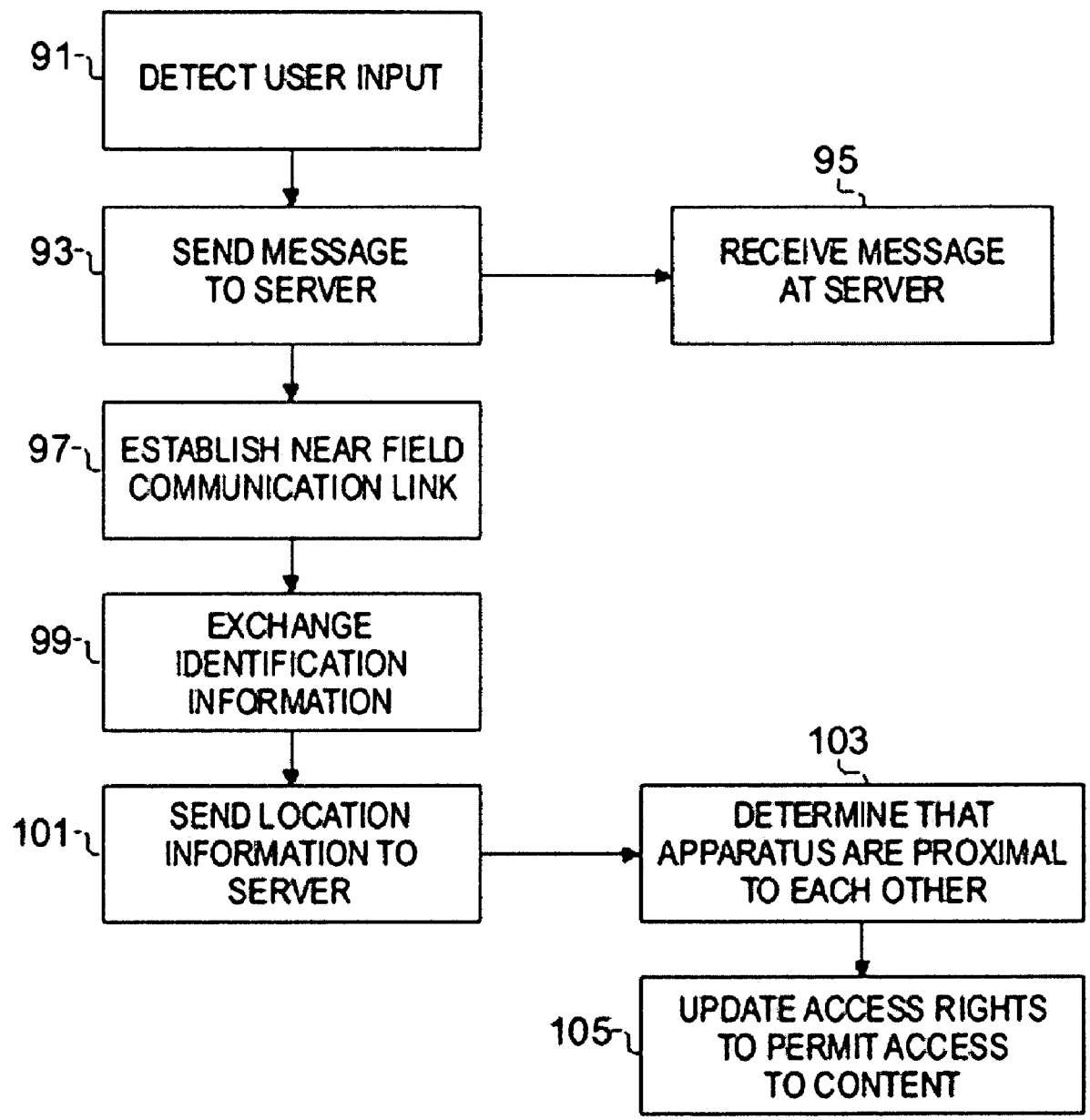
FIG. 5 illustrates a flow chart showing method blocks of a second embodiment of the invention.

A second method of enabling access to content within a network service according to some embodiments of the invention is illustrated schematically in FIG. 5. Blocks 91, 93, 97, 99 and 101 of the illustrated method occur at a first mobile apparatus 5A and blocks 95, 103 and 105 occur at a remote server 3 as illustrated in FIG. 1.

In the embodiments of the invention illustrated in FIG. 5, both of the mobile apparatus 5A and 5B are configured for near field communications so that the second communication link 11 between the two mobile apparatus 5A, 5B is a near field communication (NFC) link. The further transceivers 61 of the mobile apparatus 5A, 5B are configured to operate at a frequency of 13.56 MHz and have a communication range of approximately 4 cm to enable the near field communication.

As in the above described embodiment, the users of two mobile apparatus 5A and 5B are proximal to each other and the user of the first mobile apparatus 5A wishes to permit the user of the other mobile apparatus 5B to access their content 7 in the network service.

At block 91 the controller 51 of the mobile apparatus 5A detects a user input made via the user input device 57. As in the above described embodiment the user input indicates that the user wishes to enable the user of another mobile apparatus 5B to access content 7 relating to the network service. The user input may be, for example, actuation of a dedicated key or selection of an option from a plurality of menu of options.

In response to the detection (block 91) of the user input, at block 93 the controller 51 controls the transceiver 59 to send a message to the remote server 3 as in the above described embodiment. The message may be sent over the first communication link 9. The message indicates that the user of the mobile apparatus 5A wishes to update the access rights associated with their content 7 by permitting the user of the another mobile apparatus 5B to access the content 7.

In some embodiments of the invention the message may also contain identification information which may be sufficient to enable the server 3 to identify the user of the first mobile apparatus 5A and the content 7 to which access is to be permitted.

The message may also indicate the level of access which is to be permitted, for example, the message may also indicate whether the other user is permitted to view the content 7 or to view and also edit the content 7.

At block 95 the message is received by the remote server 3. In response to the receipt of the message the server 3 may authenticate the user of the mobile apparatus 5A and access the content 7 identified in the received message.

At block 97 a near field communication link 11 is established between the two mobile apparatus 5A and 5B. As the near field communication transceiver 61 has a very short communication range it may be necessary for the users of the mobile apparatus 5A and 5B to move their mobile apparatus 5A and 5B closer together. In some embodiments the users may physically tap the two mobile apparatus 5A and 5B together.

At block 99 the two mobile apparatus 5A, 5B exchange identification information with each other via the near field communication link 11. The identification information may be information which enables the mobile apparatus 5A, 5B or the user of the mobile apparatus 5A, 5B to be uniquely identified.

At block 101 the mobile apparatus 5A sends the received identification information to the server over the first communication link 9.

At block 103 the remote server 3 receives the identification information from the mobile apparatus 5A. As the identification information has been exchanged via a near field communication link 11 the server 3 determines that the two mobile apparatus 5A and 5B must be located very close to each other because this is a very short range communication link 11. Therefore the identification information also comprises location information as it enables the server 3 to determine the relative locations of the two mobile apparatus 5A and 5B. The server 3 also determines the identity of the user of the another mobile apparatus 5B using the information which has been received.

At block 105 the server 3 updates access rights associated with the content 7 so that the user of the another mobile apparatus 5B is permitted to access the content 7. The server 3 may update the access rights by assigning a particular access level to a user of the another apparatus 5B. This may change an existing access level or may be the first time that an access level is assigned to the user.

Once block 105 has been completed the user of the another mobile apparatus 5B can access the content 7. The user may use the another mobile apparatus 5B to access the content.

It is to be appreciated that, as with the previously described embodiment the another mobile apparatus 5B may also transmit messages to the server 3.

Embodiments of the invention as described in relation to FIG. 5 also provide a quick and easy way of enabling a user of a network service to use the network service to share their content with other users.

Using a near field communication link to exchange information provides a secure system because it requires the two mobile apparatus to be very close to each other and prevents communication links 11 being established with other mobile apparatus.

Figure 6:
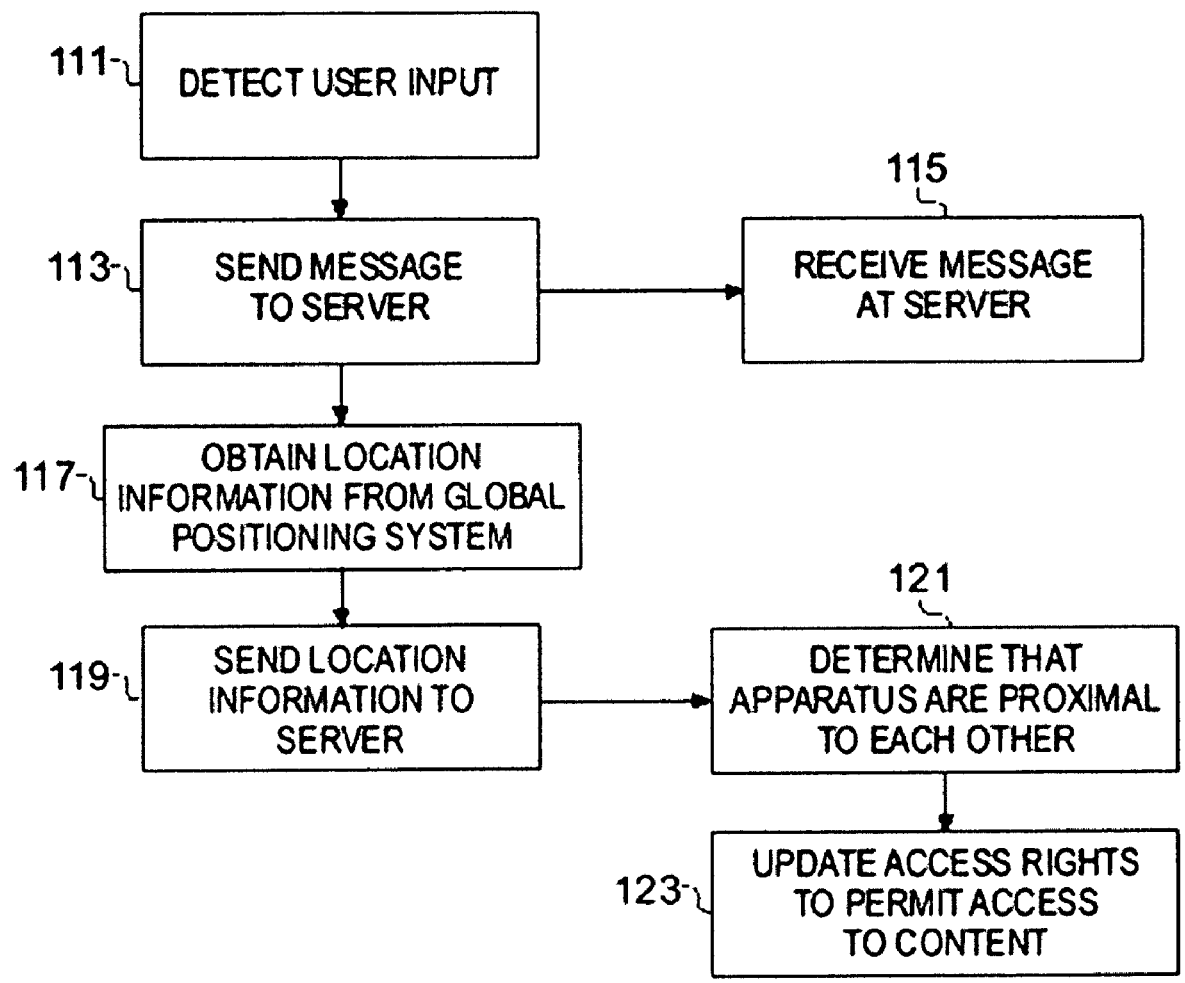
FIG. 6 illustrates a flow chart showing method blocks of a third embodiment of the invention.

A third method of enabling access to content within a network service according to some embodiments of the invention is illustrated schematically in FIG. 6. Blocks 111, 113, 117, and 119 of the illustrated method occur at a first apparatus 5A and blocks 115, 121 and 123 occur at a remote server 3 as illustrated in FIG. 1.

In the embodiments of the invention illustrated in FIG. 6, both of the apparatus 5A and 5B are configured to enable their positions to be determined by a satellite positioning system. The satellite positioning system may be an assisted satellite positioning system. In this example the further transceiver 61 may be configured for communication within the satellite positioning system to enable the location of the mobile apparatus 5A, 5B to be determined.

As in the above described embodiments, the users of two mobile apparatus 5A and 5B are proximal to each other and the user of the first mobile apparatus 5A wishes to permit the user of the other mobile apparatus 5B to access their content 7 in the network service.

At block 111 the controller 51 of the mobile apparatus 5A detects a user input made via the user input device 57. As in the above described embodiment the user input indicates that the user wishes to enable the user of another mobile apparatus 5B to access content 7 relating to the network service. The user input may be, for example, actuation of a dedicated key or selection of an option from a plurality of menu of options.

In response to the detection 111 of the user input, at block 113 the controller 51 controls the transceiver 59 to send a message to the remote server 3 as in the above described embodiments. The message may be sent over the first communication link 9. The message indicates that the user of the mobile apparatus 5A wishes to update the access rights associated with their content 7 by permitting the user of the another mobile apparatus 5B to access the content 7.

In some embodiments of the invention the message may also contain identification information which may be sufficient to enable the server 3 to identify the user of the first mobile apparatus 5A and the content 7 to which access is to be permitted.

The message may also indicate the level of access which is to be permitted, for example, the message may also indicate whether the other user is permitted to view the content 7 or to view and also edit the content 7.

At block 115 the message is received by the remote server 3. In response to the receipt of the message the server 3 may authenticate the user of the mobile apparatus 5A and access the content 7 identified in the received message.

At block 117 the mobile apparatus 5A obtains location information from the satellite position system. The location information may comprise location information relating to the first mobile apparatus 5A. The location information may also comprise location information relating to the another mobile apparatus 5B. The location information may enable the relative locations of the two mobile apparatus 5A, 5B to be determined, for example it may enable the distance between the two apparatus 5A, 5B to be determined or whether or not the two apparatus are within the same region. The location information may comprise information relating to the absolute location of the two apparatus 5A, 5B, for example it may comprise the geographical coordinates of the apparatus. In other embodiments of the invention the location information may give the location of one of the apparatus relative to the other apparatus.

At block 119 the mobile apparatus 5A sends the location information to the server 3 over the first communication link 9. In some embodiments of the invention the mobile apparatus 5A may also send identification information of the another mobile apparatus 5B. In other embodiments of the invention the another mobile apparatus 5B may send identification information to the server itself.

At block 121 the remote server 3 receives the location information from the mobile apparatus 5A. The server 3 uses the received location information to determine whether or not the two apparatus 5A, 5B are proximal to each other. For example, the server 3 may determine whether or not the two mobile apparatus 5A, 5B are within a predetermined distance of each other, or whether or not both of the mobile apparatus 5A, 5B are within a particular region.

The server 3 determines the identity of the user of the another mobile apparatus 5B using the identification information which has been received and then, at block 123 the server 3 updates access rights associated with the content 7 so that the user of the another mobile apparatus 5B is permitted to access the content 7.

Once block 123 has been completed the user of the another mobile apparatus 5B can access the content 7. The user may use the another mobile apparatus 5B to access the content.

Embodiments of the invention as described in relation to FIG. 6 also provide a quick and easy way of enabling a user of a network service to use the network service to share their content with other users.

Using a satellite positioning system to determine the relative locations of the two mobile apparatus 5A and 5B increases the security of the system as it ensures that access is only granted to users of mobile apparatus which are proximal to the first apparatus 5A.

The blocks illustrated in FIGS. 4, 5 and 6 may represent steps in a method and/or sections of code in the computer program 27, 45. The illustration of a particular order to the blocks does not necessarily imply that there is a required or preferred order for the blocks and the order and arrangement of the blocks may be varied. Furthermore, it may be possible for some steps to be omitted.

Also in some embodiments of the invention some of the blocks of the method may be repeated. For example, in embodiments of the invention where a near field communication link is established between two mobile apparatus 5A and 5B a near field communication link 11 may be established several times. In some embodiments of the invention the users of the two mobile apparatus 5A and 5B may physically tap the two mobile apparatus 5A and 5B together several times.

In such embodiments of the invention information indicative of how many times the near field communication link has been established may be sent to the remote server 3. The number of times the near field communication link 11 is established may indicate the access level which is to be assigned to the user of the other mobile apparatus 5B. For example, only establishing the near field communication link 11 once may assign a first access level to the user of the other mobile apparatus 5B in which the user is permitted to access contact information relating to the user of the mobile apparatus 5A. Establishing the near field communication link 11 twice may assign a second access level to the user of the other mobile apparatus 5B in which the user is permitted to access contact information relating to the user of the mobile apparatus 5A and also some personal content such as text. Establishing the near field communication link 11 three times may assign a third access level to the user of the other mobile apparatus 5B in which the user is permitted to access contact information relating to the user of the mobile apparatus 5A, personal content such as text and also further personal content such as images.

The near field communication link 11 may be established several times within a short period of time. For example where the user of the mobile apparatus 5A wishes to immediately assign the third access level to the user of the other mobile apparatus 5B the interval between each of the near field communication events may only be several seconds. In other embodiments of the invention the interval between near field communication events may be much larger for example it may be weeks or months. This would enable the user of the mobile apparatus 5A to gradually change the level of access permitted to the user of the other mobile apparatus 5B as they become more acquainted with them.

Although embodiments of the present invention have been described in the preceding paragraphs with reference to various examples, it should be appreciated that modifications to the examples given can be made without departing from the scope of the invention as claimed. For example in some embodiments of the invention it may be possible for the user of a mobile apparatus to permit a plurality of other users to access the content at the same time.

Also it may be possible to combine different embodiments of the invention as described above, for example, the mobile apparatus may be configured to communicate via a Bluetooth communication link and a near field communication link and also to communicate within a satellite positioning system. Also, in some embodiments of the invention more than one type of communication link may be used to determine and exchange the location information. For example, in some embodiments of the invention a near field communication link may be used to enable identification information to be exchanged so that the identification information may be used to establish a Bluetooth or wireless local area network. In other embodiments of the invention the location information may be obtained using a satellite positioning system and then exchanged between the apparatus 5A and 5B using a communication link such as a Bluetooth communication link.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   receiving, at a server, location information relating to a first remote apparatus and another remote apparatus;
   determining, using the received location information, that the first remote apparatus and the another remote apparatus are proximal to each other;
   updating, in response to the determining that the first remote apparatus and the another remote apparatus are proximal to each other, access rights within a network service to enable a user of the another remote apparatus to access content associated with a user of the first remote apparatus.

2. A method as claimed in claim 1 further comprising receiving, at the server, a message from the first remote apparatus indicating that a user of the first remote apparatus wishes to permit a user of another remote apparatus to access content relating to a network service; receiving, at the server, first identification information from the first remote apparatus which enables the server to identify the content to which access is to be permitted; receiving, at the server, second identification information which enables a user of the another remote apparatus to be identified.

3. A method as claimed in claim 1 wherein the location information is obtained using a short range wireless communication link between the first remote apparatus and the another remote apparatus.

4. A method as claimed in claim 3 wherein the short range wireless communication link is a Bluetooth communication link or a near field communication link.

5. A method as claimed in claim 1 wherein the location information is obtained using a satellite positioning system.

6. A method as claimed in claim 1 wherein the location information enables the server to determine that the first remote apparatus and the another remote apparatus are within a particular region.

7. A method as claimed in claim 1 wherein the location information enables the server to determine that the first apparatus and the another apparatus are within a predetermined distance of each other.

8. A method as claimed in claim 1 wherein the server updates the access rights by assigning one of a plurality of access levels to the user of the another apparatus.

9. A method as claimed in claim 1 wherein the server also updates access rights within the network service to enable the user of the first remote apparatus to access content associated with the user of the another remote apparatus.

10. A method as claimed in claim 1 wherein the network service is a subscriber service.

11. An apparatus comprising:
   at least one receiver configured to receive location information relating to a first remote apparatus and a second remote apparatus; and
   a controller configured to determine, using the received location information, that the first remote apparatus and the another remote apparatus are proximal to each other, wherein the controller is also configured to update, in response to the determining that the first remote apparatus and the another remote apparatus are proximal to each other, access rights within a network service to enable a user of the another remote apparatus to access content associated with a user of the first remote apparatus.

12. An apparatus as claimed in claim 11 comprising at least one receiver configured to receive a message from the first remote apparatus indicating that a user of the first remote apparatus wishes to permit a user of the another remote apparatus to access content relating to a network service; at least one receiver configured to receive first identification information from the first remote apparatus which enables the apparatus to identify the content to which access is to be permitted and second identification information which enables a user of another remote apparatus to be identified.

13. An apparatus as claimed in claim 12 wherein the location information is obtained using a short range wireless communication link between the first remote apparatus and the another remote apparatus and is then transmitted to the apparatus.

14. An apparatus as claimed in claim 13 wherein the short range wireless communication link is a Bluetooth communication link or a near field communication link.

15. An apparatus as claimed in claim 12 wherein the location information is obtained using a satellite positioning system.

16. An apparatus as claimed in claim 12 wherein the location information enables the apparatus to determine that the first remote apparatus and the another remote apparatus are within a particular region.

17. An apparatus as claimed in claim 12 wherein the location information enables the apparatus to determine that the first apparatus and the another apparatus are within a predetermined distance of each other.

18. An apparatus as claimed in claim 12 wherein the apparatus updates the access rights by assigning one of a plurality of access levels to the user of the another apparatus.

19. A non-transitory computer-readable storage medium, comprising computer program instructions, which, when executed by one or more processors, cause an apparatus to perform,
receiving location information of a first remote apparatus and a second remote apparatus; and
determining, using the received location information, that the first remote apparatus and the another remote apparatus are proximal to each other; and
updating, in response to the determining that the first remote apparatus and the another remote apparatus are proximal to each other, access rights within a network service to enable a user of the another remote apparatus to access the identified content.

20. A non-transitory computer-readable storage medium as claimed in claim 19, wherein the apparatus is caused to further perform,
receiving first identification information from the first remote apparatus which enables the apparatus to identify the content to which access is to be permitted and second identification information which enables a user of another remote apparatus to be identified.

* * * * *